(12) United States Patent
Szeremeta

(10) Patent No.: US 8,547,658 B1
(45) Date of Patent: Oct. 1, 2013

(54) DATA STORAGE DEVICE ENCLOSURE ENABLING USE OF A COMMON SHOCK MOUNT ACROSS DIFFERENT PRODUCTS

(71) Applicant: Western Digital Technologies, Inc., Irvine, CA (US)

(72) Inventor: Wally Szeremeta, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/655,297

(22) Filed: Oct. 18, 2012

(51) Int. Cl.
*G11B 17/00* (2006.01)

(52) U.S. Cl.
USPC .................................................... 360/97.19

(58) Field of Classification Search
USPC .......... 360/97.19, 97.13, 97.14, 97.15, 97.12, 360/97.17, 97.16, 97.18, 97.11, 99.12, 98.07, 360/99.18
See application file for complete search history.

(56) References Cited

U.S. PATENT DOCUMENTS

| | | | |
|---|---|---|---|
| 4,713,714 A | 12/1987 | Gatti et al. | |
| 4,831,476 A | 5/1989 | Branc et al. | |
| 5,004,207 A | 4/1991 | Ishikawa et al. | |
| 5,041,924 A | 8/1991 | Blackborow et al. | |
| 5,081,551 A | 1/1992 | Aruga | |
| 5,124,855 A | 6/1992 | Dew et al. | |
| 5,216,582 A | 6/1993 | Russell et al. | |
| 5,223,996 A | 6/1993 | Read et al. | |
| 5,349,486 A | 9/1994 | Sugimoto et al. | |
| 5,463,527 A | 10/1995 | Hager et al. | |
| 5,535,092 A | 7/1996 | Bang | |
| 5,654,875 A | 8/1997 | Lawson | |
| 5,694,267 A | 12/1997 | Morehouse et al. | |
| 5,726,834 A * | 3/1998 | Eckberg et al. | 360/261.1 |
| 5,757,617 A | 5/1998 | Sherry | |
| 5,777,821 A | 7/1998 | Pottebaum | |
| 5,949,619 A * | 9/1999 | Eckberg et al. | 360/291 |
| 5,958,212 A | 9/1999 | Yamamura et al. | |
| 6,125,097 A | 9/2000 | Wu | |
| 6,130,817 A | 10/2000 | Flotho et al. | |
| 6,154,360 A | 11/2000 | Kaczeus, Sr. et al. | |
| 6,166,901 A | 12/2000 | Gamble et al. | |

(Continued)

FOREIGN PATENT DOCUMENTS

EP     355534     8/1989

OTHER PUBLICATIONS

Peter A. Masterson, "Isolation Techniques for 2.5-Inch Hard Disk Drives", https://www.earsc.com, 4 pages.
Seagate "Disc Drive Acoustics", Oct. 2001,7 pages.

(Continued)

Primary Examiner — Allen T Cao

(57) ABSTRACT

A data storage device assembly comprises a data storage device, a shock mount configured to couple to the data storage device, and an enclosure comprising first and second portions. The first enclosure portion may comprise a first pocket defining a first nesting surface, and a first plurality of ribs configured to contact a first portion of the shock mount over an aggregate first surface area that is less than a surface area of the first nesting surface. The second enclosure portion may be configured to mate with the first enclosure portion to enclose the data storage device therebetween. The second enclosure portion may comprise a second pocket defining a second nesting surface and a second plurality of ribs configured to contact a second portion of the shock mount over an aggregate second surface area that is less than a surface area of the second nesting surface.

20 Claims, 4 Drawing Sheets

(56) References Cited

U.S. PATENT DOCUMENTS

| | | |
|---|---|---|
| 6,249,432 B1 | 6/2001 | Gamble et al. |
| 6,275,352 B1 | 8/2001 | Tadepalli et al. |
| 6,285,545 B1 | 9/2001 | Lopez |
| 6,292,359 B1 | 9/2001 | Boe |
| 6,487,039 B1 | 11/2002 | Bernett |
| 6,496,362 B2 | 12/2002 | Osterhout et al. |
| 6,498,722 B1 | 12/2002 | Stolz et al. |
| 6,545,865 B2 | 4/2003 | Albrecht et al. |
| 6,567,265 B1 | 5/2003 | Yamamura et al. |
| 6,618,246 B2 | 9/2003 | Sullivan et al. |
| 6,714,405 B2 | 3/2004 | Jitsukawa |
| 6,751,092 B1 | 6/2004 | Ohnishi et al. |
| 6,873,524 B2 | 3/2005 | Kaczeus, Sr. et al. |
| 6,958,884 B1 | 10/2005 | Ojeda et al. |
| D512,422 S | 12/2005 | Sato et al. |
| 7,106,582 B2 | 9/2006 | Albrecht et al. |
| 7,106,583 B2 | 9/2006 | Koh et al. |
| 7,187,543 B2 | 3/2007 | Zimlin |
| 7,215,506 B2 | 5/2007 | Albrecht et al. |
| 7,227,761 B2 | 6/2007 | Estes et al. |
| 7,251,131 B2 | 7/2007 | Shah et al. |
| 7,312,982 B2 | 12/2007 | Bruner et al. |
| 7,375,922 B2 * | 5/2008 | Chen et al. ............... 360/97.19 |
| 7,450,375 B2 | 11/2008 | Xu |
| 7,471,509 B1 | 12/2008 | Oliver |
| 7,480,136 B2 | 1/2009 | Lalouette |
| 7,483,238 B2 * | 1/2009 | Xu et al. ............... 360/97.19 |
| 7,561,375 B2 | 7/2009 | Kim et al. |
| 7,667,925 B2 * | 2/2010 | Kim et al. ............... 360/97.19 |
| 7,701,705 B1 | 4/2010 | Szeremeta |
| 7,817,373 B2 | 10/2010 | Choi et al. |
| 8,300,352 B1 | 10/2012 | Larson et al. |
| 2003/0174464 A1 | 9/2003 | Funawatari et al. |
| 2004/0032711 A1 | 2/2004 | Kaczeus, Sr. et al. |
| 2004/0190193 A1 | 9/2004 | Kuwajima |
| 2004/0255313 A1 | 12/2004 | Kaczeus, Sr. et al. |
| 2005/0088778 A1 | 4/2005 | Chen et al. |
| 2005/0180045 A1 | 8/2005 | Tsuda et al. |
| 2005/0185326 A1 | 8/2005 | Bruner et al. |
| 2005/0275966 A1 | 12/2005 | Janik et al. |
| 2006/0001992 A1 | 1/2006 | Friedrichs |
| 2006/0002076 A1 | 1/2006 | Albrecht et al. |
| 2006/0158775 A1 | 7/2006 | Sega et al. |
| 2007/0025014 A1 * | 2/2007 | Kim ............... 360/97.01 |
| 2007/0076327 A1 | 4/2007 | Yang et al. |
| 2007/0133121 A1 * | 6/2007 | Xu et al. ............... 360/97.01 |
| 2007/0133122 A1 * | 6/2007 | Kim et al. ............... 360/97.01 |
| 2010/0290154 A1 * | 11/2010 | Kim et al. ............... 360/97.02 |

OTHER PUBLICATIONS

Shawn Casey, "Hard Drive Mounting in Notebook Computer Systems", 2579-771615-A00-P2, Feb. 2011, 29 pages, Western Digital White Paper available at www.wdc.com.

* cited by examiner

DATA STORAGE DEVICE ENCLOSURE ENABLING USE OF A COMMON SHOCK MOUNT ACROSS DIFFERENT PRODUCTS

BACKGROUND

Due to their sensitive components, disk drives are vulnerable to externally induced shocks and vibrations. Because magnetic disk drives are predominantly designed for operation in stationary environments, external shock and vibration protection is often required to improve the robustness of disk drives in mobile applications. To fulfill this requirement, protective cases having vibration and shock dampening characteristics are often used to carry and transport small external disk drives.

It is a common practice to provide internal shock and vibration isolation to a portable disk drive encased in a plastic enclosure. Conventionally, elastomeric mounts having various geometric shapes are used to support the disk drive and to provide the necessary shock and vibration isolation within its plastic enclosure. Typically, these elastomeric mounts are often custom-molded to fit the disk drive assembly and the enclosure. However, this results in different elastomeric mount designs and different elastomeric mount supporting structures that are only suitable for a single disk drive model or a small number of disk drive models. Ideally, the elastomeric mount's design should be suitable for a wide variety of models of data storage devices.

DETAILED DESCRIPTION

Ideally, a shock and vibration isolation system should balance the stiffness of the shock mounts and shock mount supporting structures to achieve a desired shock mount preload. The stiffness and shock dampening effect provided by the shock mounts is a function of at least the surface area of contact between the shock mounts and the shock mount supporting structures. One way to accommodate drives having different weights is to modify the shock mounts in order to achieve the necessary shock mount stiffness—that is, to use a different set of shock mounts for each model of data storage device. For example, the size, shape, or materials of the shock mounts can be manipulated to provide a desired degree of shock mount stiffness. According to one embodiment, another way to accommodate different drives (e.g., disk drives of different weights) is to modify the shock mount supporting structures to change the aggregate shock mount-contacting surface between the shock mounts and the shock mount supporting structures. According to one embodiment, the similar shock mounts may be used across a plurality of disk drive models. Such changes to the aggregate shock mount-contacting surface may be made separately from or together with changes to the stiffness of the shock mounts and the force with which the shock mount supporting structures compress the shock mounts, among other possible variables.

Figure 1:
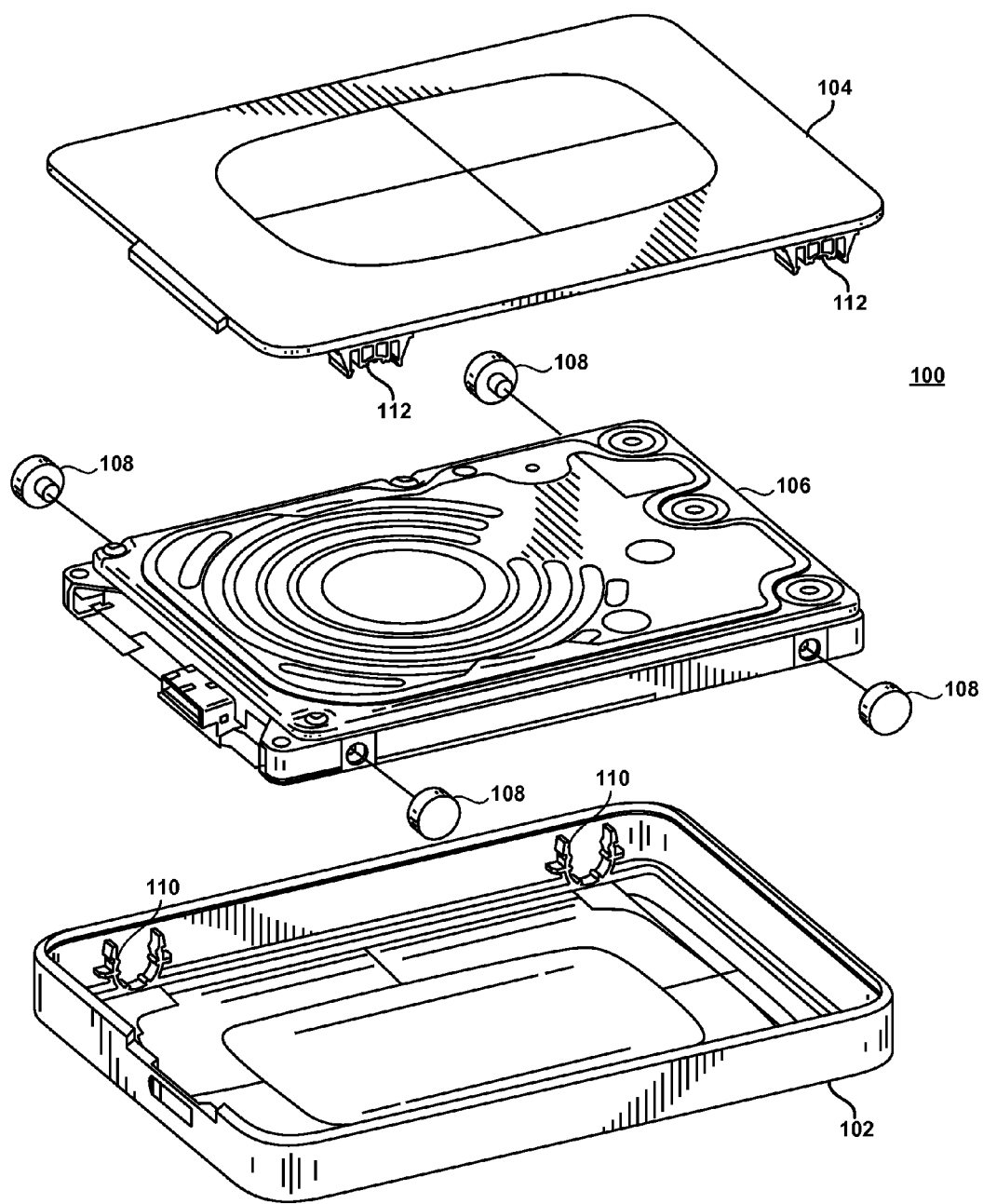
FIG. 1 shows a perspective view of a data storage device assembly according to one embodiment.
Figure 2:
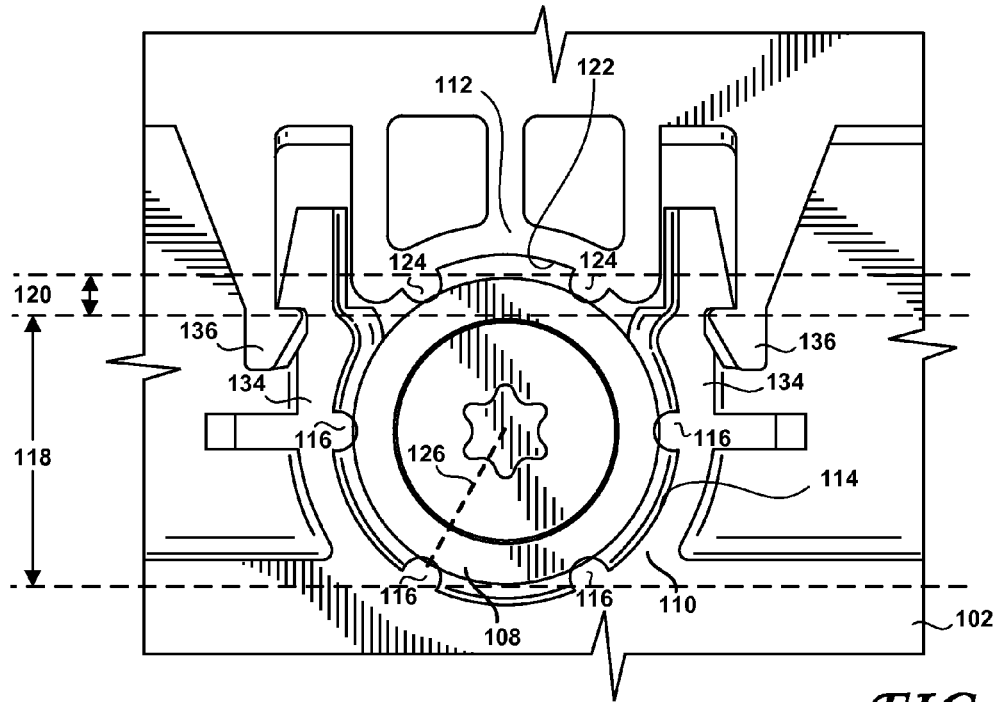
FIG. 2 shows a view of a shock mount held captive by first and second pockets comprising a plurality of ribs, according to one embodiment.
Figure 3:
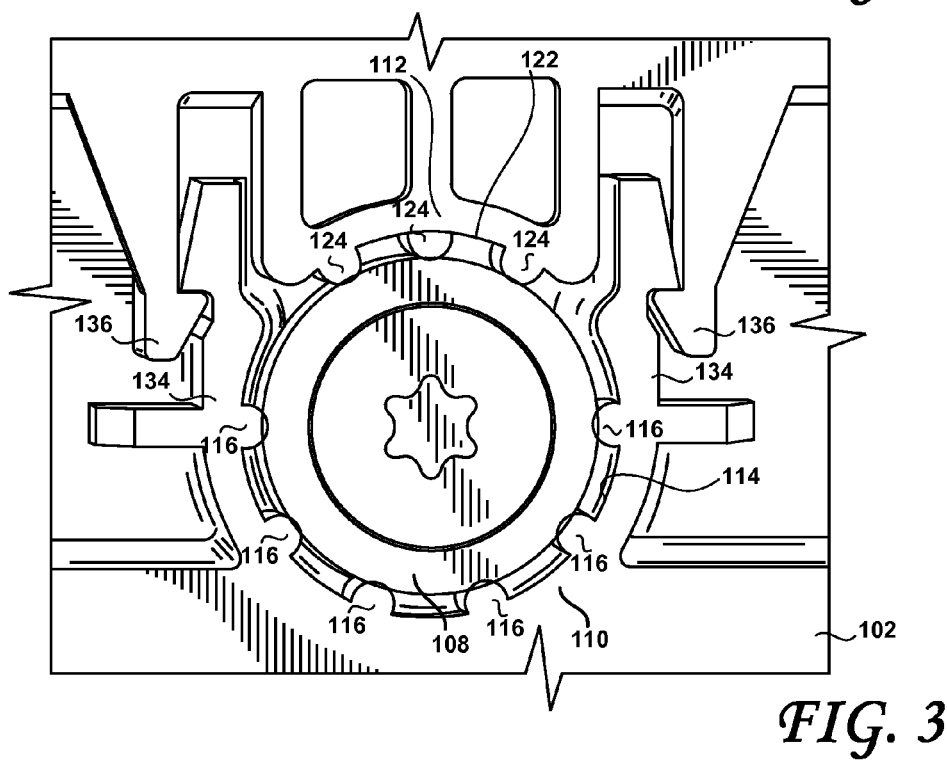
FIG. 3 shows a view of a shock mount held captive by first and second pockets comprising a plurality of ribs, according to one embodiment.

FIG. 1 shows a perspective view of a data storage device assembly 100 according to one embodiment. For example, the data storage device assembly 100 may, but need not, be configured as an external data storage device. According to one embodiment, the data storage device assembly 100 may comprise a first enclosure portion 102 and a second enclosure portion 104. The first enclosure portion 102 may be configured to mate with the second enclosure portion 104 to enclose the data storage device 106 between the first and second enclosure portions 102, 104. As shown in FIG. 1, the first enclosure portion 102 may be configured as a lower enclosure portion and the second enclosure portion may be configured as an upper enclosure portion. According to one embodiment, the first and/or second enclosure portions 102, 104 may comprise various materials, such as plastic, metal, and the like. The first and/or second enclosure portions 102, 104 may comprise the same or different material(s). The first and second enclosure portions 102 and 104 may be attached to one other in a variety of ways, such as adhesive, latches, fasteners, etc. In one embodiment, the first enclosure portion 102 may comprise mounting latches 134 and the second enclosure portion 104 may comprise mounting latches 136 configured to cooperate and engage with the mounting latches 134 to secure the first and second enclosure portions 102, 104 to one another, as shown in FIGS. 2 and 3. Other mechanisms may be provided in place of or in addition to the mounting latches 134, 136 to secure the first enclosure portion 102 to the second enclosure portion 104.

As shown in FIG. 1, the first and second enclosure portions 102, 104 may be configured to enclose a data storage device 106. The data storage device 106 may comprise a rotating media data storage device, a solid state data storage device or a hybrid data storage device comprising both rotating media and solid state memory. As shown, the data storage device assembly 100 may further comprise at least one shock mount 108 configured to couple to and support the data storage device 106 within the mated first and second enclosure portions 102, 104. According to one embodiment, the data storage device assembly 100 may comprise four such shock mounts 108, each configured to couple at or near a corner, for example, of the data storage device 106, as shown in FIG. 1. In one embodiment, the shock mounts 108 are configured to have substantially the same stiffness. In another embodiment, one or more of the shock mounts 108 may be stiffer than the other shock mounts 108 and/or have different characteristics. One or more of the shock mounts 108 may comprise, for example, a plastic or rubber material and/or some other elastomer. The shock mounts 108 may, according to one embodiment, be generally cylindrical in shape, although other shapes may be utilized. As shown in FIG. 1, each of the shock mounts 108 may be configured to be coupled to the data storage device 106. Such coupling may take the form of, for example, an extension configured to fit within a corresponding blind bore within the data storage device 106, an adhesive or any other manner of coupling a shock mount 108 to the data storage device 106 for shock and vibration isolation purposes.

As shown in FIG. 1, for each of the shock mounts 108, the first enclosure portion 102 may comprise a first pocket 110. Only two such first pockets 110 are visible in the perspective view of FIG. 1. As also shown in FIG. 1, for each of the shock mounts 108, the second enclosure portion 104 may comprise a second pocket 112. Only two such second pockets 112 are visible in the perspective view of FIG. 1. The first and second pockets 110, 112 and the shock mounts 108 may be aligned with one another such that each corresponding pair of first and second pockets 110, 112 may hold a respective one of the shock mounts 108 captive when the first enclosure portion 102 is mated with the second enclosure portion 104. The mating thereof may be, for example, via an interference fit mechanism, a latch mechanism comprising mounting latches 134, 136 (FIGS. 2-4) or any other mechanism to securely mate the first and second enclosure portions 102, 104 to enclose the data storage device 106 and to exert the desired compressive force on the shock mounts 108 held captive between the first and second pockets 110, 112. In one embodiment, mounting latches 134, 136 may be disposed adjacent the first and second pockets 110, 112, respectively. Such a configuration may provide a latching force that is in close proximity to the center of the shock mounts 108. By latching in close proximity to the shock mounts 108 in this manner, the shock mounts 108 may be held captive in a precise and secure manner.

FIG. 2 shows a view of a shock mount 108 held captive by first and second pockets 110, 112, according to one embodiment. As shown therein, the first pocket 110 may define a first nesting surface 114. According to one embodiment, the nesting surface 114 may be non-planar. According to one embodiment and as shown in FIG. 2, the nesting surface 114 may define a generally semi-circular profile. The nesting surface 114, however, may define profiles having other shapes. According to one embodiment, the first pocket 110 may define a first plurality of ribs 116. That is, the nesting surface 114, according to one embodiment, may define one or more local regions that extend away from the nesting surface 114 to contact the shock mount 108. Such local regions that contact the shock mount 108 may comprise the first plurality of ribs 116. The first plurality of ribs 116 may contact a first portion 118 of the shock mount 108 over an aggregate first surface area that is less than the surface area of the first nesting surface 114. That is, each of the first plurality of ribs 116 of each of the first pockets 110 may contact a first portion 118 of a respective one of the shock mounts 108 over a surface area. The sum of these surface areas over which the first plurality of ribs 116 contact the shock mounts 108 may be, according to one embodiment, less than the surface area of the nesting surface 114 of the first pocket 110. Stated differently still, the first plurality of ribs 116 are configured to reduce the surface area of contact between the first pocket 110 and the shock mount 108, as compared to the surface area of the nesting surface 114.

As also shown in FIG. 2, the second pocket 112 may define a second nesting surface 122. According to one embodiment, the nesting surface 122 may also be non-planar. According to one embodiment and as shown in FIG. 2, the nesting surface 122 may define a generally semi-circular or at least curved profile. Other profiles may be accommodated. According to one embodiment, the second pocket 112 may also define a second plurality of ribs 124. That is, the nesting surface 122, according to one embodiment, may define one or more local regions that extend away from the nesting surface 122 to contact the shock mount 108. It follows, therefore, that regions outside such locally-raised regions may not be in contact with the shock mount 108. Such locally-raised regions that contact the shock mount 108 may comprise the second plurality of ribs 124. The second plurality of ribs 124, therefore, may contact a second portion 120 of the shock mount 108 over an aggregate first surface area that is less than the surface area of the second nesting surface 122. That is, each of the second plurality of ribs 124 of each of the second pockets 112 may contact a second portion 120 of a respective one of the shock mounts 108 over a surface area. The sum of these surface areas over which the second plurality of ribs 124 contact the shock mounts 108 may be, according to one embodiment, less than the surface area of the nesting surface 122 of the second pocket 112. Stated differently still, the second plurality of ribs 124 are configured to reduce the surface area of contact between the second pocket 112 and the shock mount 108, as compared to the surface area of the nesting surface 122. The relative sizes or proportions of the first and second portions 118, 120 of the shock mounts may be freely selected.

As shown in FIG. 2 and according to one embodiment, the first and second plurality of ribs 116, 124 may be configured to extend generally in a radial direction with respect to a center of the shock mount 108, as indicated at 126. It is to be noted that the first and second plurality of ribs 116, 124 need not be configured to extend generally in a radial direction with respect to a center of the shock mount 108. Instead, one or more of the first and second plurality of ribs 116, 124 may be configured so as to be more or less inclined in a tangential direction relative to an exterior surface of the shock mount 108, for example.

According to one embodiment, the first and second plurality of ribs 116, 124 may be configured according to the desired stiffness of the shock mount 108. For example and according to one embodiment, the first and second plurality of ribs 116, 124 may be configured according to the weight of the data storage device 106 and/or may be configured or tuned to dampen one or more selected resonant frequencies of the data storage device 106 and/or of the external environment in which the data storage device 106 is to operate. To do so, the number of such first and second plurality of ribs 116, 124 and/or the shape thereof may be selected according to the desired stiffness and/or desired damping characteristics of the shock mount 108. According to one embodiment, the total or aggregate surface area over which the first and second ribs 116, 124 contact the shock mount 108 determines, at least in part, the stiffness of the shock mount 108, as it is held captive between the first and second pockets 110, 112 when the first and second enclosure portions 102, 104 are mated to one another to enclose the data storage device 106. For example, assuming that the first ribs 116 collectively contact the shock mount 108 over a first surface area and assuming that the second ribs 124 collectively contact the shock mount 108 over a second surface area, other factors affecting the stiffness of the shock mount 108 being equal, greater aggregate first and second surface areas increase the resultant stiffness of the shock mount 108 and comparatively smaller aggregate first and second surface areas correspondingly decrease the stiffness of the shock mount 108, thereby rendering the shock mount 108 more compliant.

By selectively modifying these aggregate first and second surface areas, the first and second enclosure portions 102, 104 may be configured to apply a predetermined amount of compressive force, according to a predetermined distribution, on the shock mount 108 when the first enclosure portion 102 is mated to the second enclosure portion 104. The contact areas of the first and second plurality of ribs 116, 124 with the shock mount 108 may be modified, for example, by changing the number of the first and/or second plurality of ribs 116, 124, changing the size of the contact area with which one or more of the first and second plurality of ribs 116, 124 contacts the shock mount 108, or both. For example, FIG. 2 shows a first pocket 110 comprising four ribs 116 and a second pocket 112 comprising two ribs 124. For example, the width of such ribs 116, 124 may be increased or decreased to correspondingly increase or decrease, respectively, the aggregate contact areas thereof to, in turn, correspondingly increase or decrease the resultant stiffness of the shock mount 108, all other factors affecting the stiffness thereof being equal. However, as shown in FIG. 3, while keeping the respective contact areas of the first and second plurality of ribs 116, 124 the same, the number thereof may be increased to correspondingly increase the aggregate contact areas with the shock mount 108 which, in turn, correspondingly increases the resultant stiffness of the shock mount 108, all other factors affecting the stiffness thereof being equal. Various geometry features may be employed to control the contact area of the shock mount 108 and the first and second pockets 110, 112. For example, in place of the ribs 116, 124, the first and second pockets 110, 112 may comprise gaps, slots, dimples, or cutouts to reduce the amount of surface area thereof contacting the shock mount 108. According to one embodiment, reduction of the surface area effectively makes the shock mount 108 less stiff (more compliant). Since the first and second pockets 110, 112 may be an integral part of the first and second enclosure portions 102, 104, each data storage device enclosure may be configured to comprise first and second pockets 110, 112, having the requisite aggregate surface area thereof contacting the shock mounts 108 to thereby configure the stiffness of the shock mounts 108 according to, at least in part, the weight of the data storage device and/or the need to dampen specific resonant frequencies of the data storage device and/or the environment in which the data storage device assembly 100 assembly is to operate.

Figure 4:
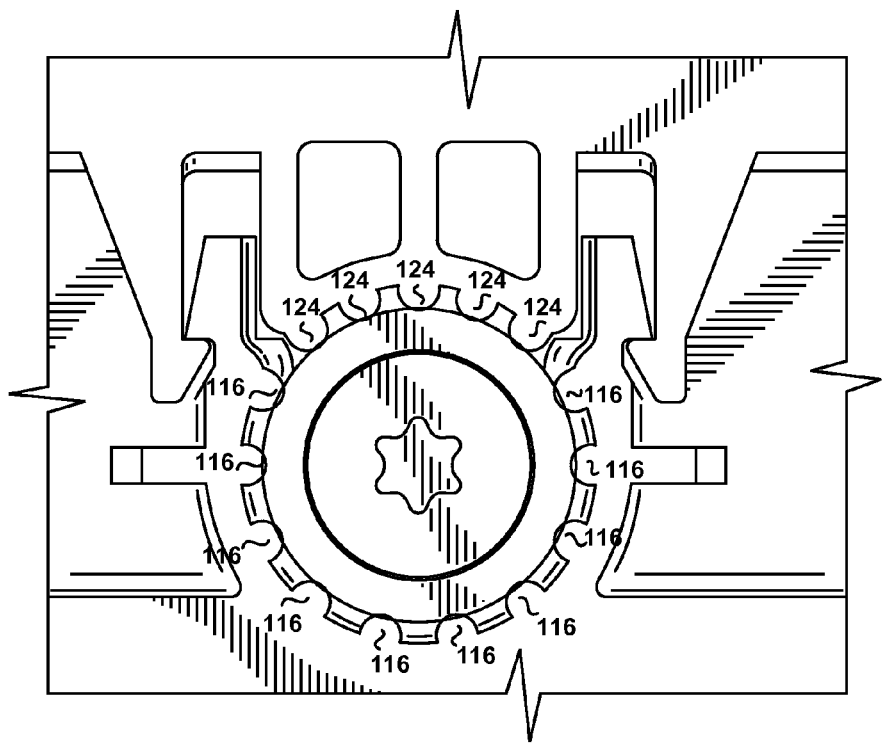
FIG. 4 shows a view of a shock mount held captive by first and second pockets comprising a plurality of ribs, according to one embodiment.

In FIG. 3, there are six ribs 116 and three ribs 124. Therefore, if the ribs 116, 124 of FIG. 3 have the same geometry as those of FIG. 2, the aggregate surface area with which the ribs 116, 124 contact the shock mount 108 is 50% greater than the aggregate surface area of contact of the ribs 116, 124 of FIG. 2, leading to a greater stiffness of the shock mount 108. Such increased stiffness may be appropriate, for example, a heavier data storage device 106. In the case of a rotating media data storage device, for example, a two or three-platter disk drive may be heavier than a one-platter disk drive. According to one embodiment, a heavier data storage device 106 may be associated with increased aggregate surface area of contact of the ribs 116, 124 with the shock mount 108, whereas a comparatively lighter data storage device 106 may be associated with decreased aggregate surface area of contact of the ribs 116, 124 with the shock mount 108. FIG. 4 shows a shock isolation and vibration damping system comprising ten ribs 116 and five ribs 124. Other combinations are possible. According to one embodiment, the shock isolation and vibration damping characteristics may be further manipulated by not only varying the number, shape and size of the ribs 116, 124, but also by manipulating the durometer of the shock mount 108 and/or other physical characteristics of the material and/or shape of the shock mount 108. For example, the shock mount 108 may have a laminated structure or present a gradient of one or more physical characteristics over any of its dimensions.

Figure 5:
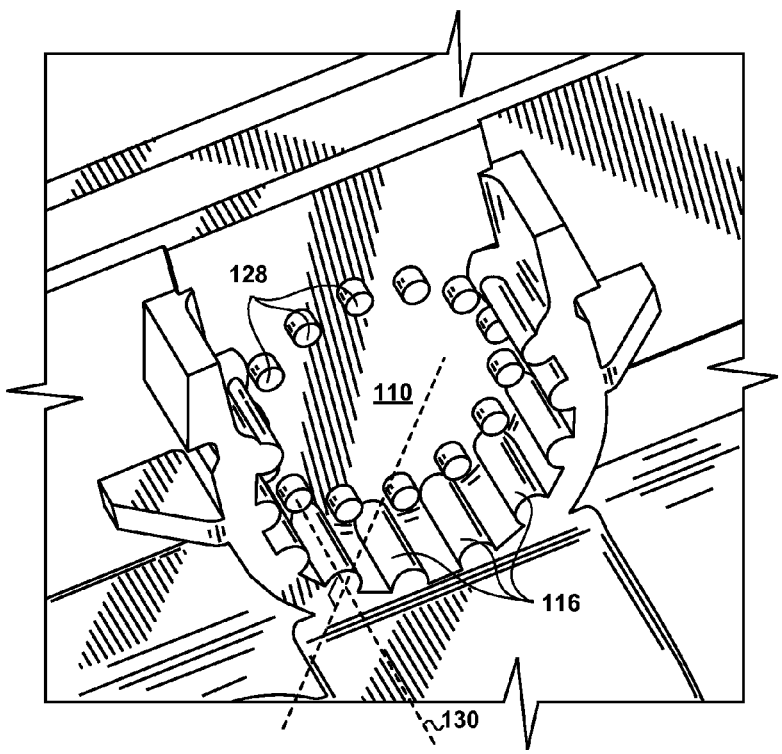
FIG. 5 is a perspective view of a pocket of an enclosure portion, comprising a plurality comprising a plurality of ribs and a plurality of axially-directed insular extensions, according to one embodiment.
Figure 6:
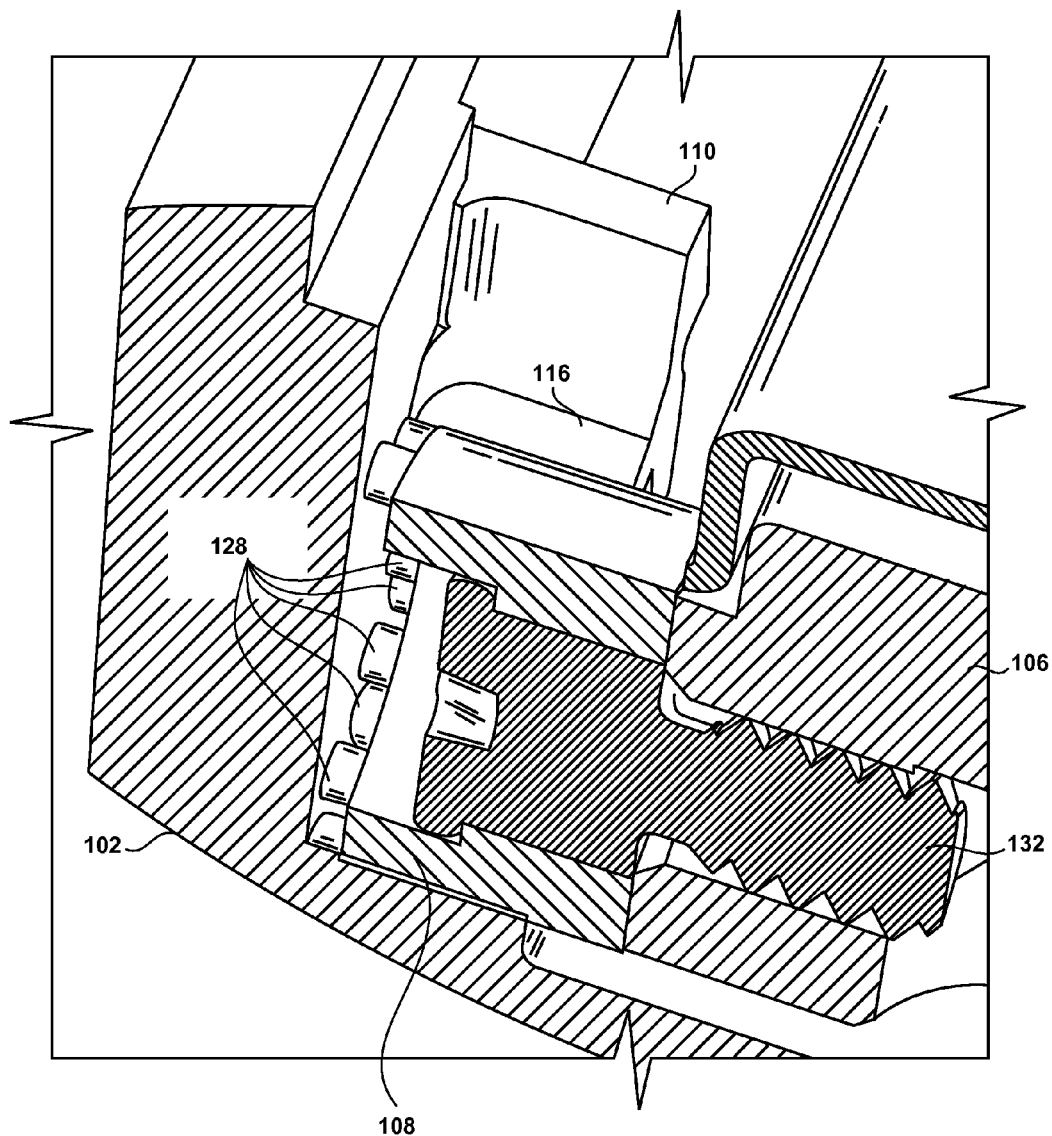
FIG. 6 is a perspective view of a portion of a pocket, a shock mount and a data storage device, showing a manner in which the plurality of ribs and the plurality of axially-directed insular extensions may contact a seated shock mount, according to one embodiment.

FIG. 5 is a perspective view of a pocket of an enclosure portion, comprising a plurality of ribs and a plurality of axially-directed insular extensions, according to one embodiment. As shown therein, the first and/or second pockets 110, 112 may also comprise a plurality of axially-directed insular extensions (e.g., bumps, rods or the like) 128 that may be oriented in a direction that may be generally perpendicular to the first and second plurality of ribs 116, 124. As shown in FIG. 6, one or more of the plurality of axially-directed insular extensions 128 may define respective free ends (best seen in FIG. 5) that are configured to contact the shock mount 108. Such axially-directed insular extensions 128, according to one embodiment, may be configured to provide some measure of axial shock isolation and vibration damping. According to one embodiment, the number, shape and geometry of the axially-directed insular extensions 128 may be varied at will to variably compress the shock mount 108 in the axial direction 130 and determine the response of the shock mount 108 in the presence of shocks and vibrations having an axially-directed component. FIG. 6 also shows the manner in which the shock mount 108 may be coupled to the data storage device 106. Indeed, according to one embodiment, the shock mount 108 may be cylindrical in shape and comprise an inner bore having a recessed shelf. As shown in FIG. 6, a screw 132 may be provided within the inner bore of the shock mount 108, which screw 132 may be threaded into a corresponding threaded blind bore within the first enclosure component 102 until the head of the screw 132 rests against the recessed shelf within the shock mount 108. In this configuration, the shock mount 108 may be configured to be compressed in the axial direction 130 by an amount that is less than the amount of recession between the exposed surface of the screw head and the surface of the shock mount 108 in contact with the axially-directed insular extensions 128. As noted earlier, the shock mounts 108 may be coupled to the data storage device 106 using other structures and modalities.

While certain embodiments of the disclosure have been described, these embodiments have been presented by way of example only, and are not intended to limit the scope of the disclosure. Indeed, the novel devices and assemblies described herein may be embodied in a variety of other forms. Furthermore, various omissions, substitutions and changes in the form of the devices and assemblies described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage device assembly, comprising:
   a data storage device;
   a shock mount configured to couple to the data storage device;
   a first enclosure portion comprising a first pocket defining a first nesting surface, the first pocket comprising a first plurality of ribs configured to contact a first portion of the shock mount over an aggregate first surface area that is less than a surface area of the first nesting surface; and a second enclosure portion configured to mate with the first enclosure portion to enclose the data storage device between the first and second enclosure portions, the second enclosure portion comprising a second pocket defining a second nesting surface, the second pocket comprising a second plurality of ribs configured to contact a second portion of the shock mount over an aggregate second surface area that is less than a surface area of the second nesting surface.

2. The data storage device assembly of claim 1, wherein at least one of the first and second pockets define a generally semi-circular shape.

3. The data storage device assembly of claim 1, wherein the first and second plurality of ribs extend generally in a radial direction with respect to a center of the shock mount.

4. The data storage device assembly of claim 1, wherein at least one of the first and second pockets comprise a plurality of axially-directed insular extensions that are generally perpendicular to the first and second plurality of ribs, at least some of the plurality of axially-directed insular extensions defining respective free ends configured to contact the shock mount.

5. The data storage device assembly of claim 1, wherein the first and second plurality of ribs are configured according to a desired stiffness of the shock mount.

6. The data storage device assembly of claim 1, wherein the first and second plurality of ribs are configured according to a weight of the data storage device.

7. The data storage device assembly of claim 1, wherein a number and shape of the first and second plurality of ribs are selected according to a desired stiffness of the shock mount.

8. The data storage device assembly of claim 1, wherein the first and second plurality of ribs are configured such that greater aggregate first and second surface areas increases a stiffness of the shock mount and such that comparatively smaller aggregate first and second surface areas decreases the stiffness of the shock mount.

9. The data storage device assembly of claim 1, wherein the first and second enclosure portions are configured to apply a predetermined amount of compressive force on the shock mount when the first enclosure portion is mated to the second enclosure portion.

10. The data storage device assembly of claim 1, further comprising first to fourth shock mounts configured to couple to or near respective first to fourth corners of the data storage device and wherein:
the first enclosure portion comprises four separate first pockets, each configured to contact a first portion of a respective one of the first to fourth shock mounts, and
the second enclosure portion comprises four separate second pockets, each configured to contact a second portion of a respective one of the first to fourth shock mounts.

11. An external data storage device, comprising:
a data storage device assembly;
a plurality of shock mounts coupled to the data storage device assembly, the plurality of shock mounts each being generally cylindrically-shaped; and
an enclosure enclosing the data storage device assembly and the plurality of shock mounts and comprising:
a first enclosure portion comprising a separate first pocket for each of the plurality of shock mounts, each of the first pockets comprising a first plurality of generally radially-extending ribs defining a plurality of first shock mount-contacting surfaces; and
a second enclosure portion configured to mate with the first enclosure portion, the second enclosure portion comprising a separate second pocket for each of the plurality of shock mounts, each of the second pockets comprising a second plurality of generally radially-extending ribs defining a plurality of second shock mount-contacting surfaces.

12. The external data storage device of claim 11, wherein the first and second enclosure portions are configured to hold the plurality of shock mounts captive with a predetermined pre-load.

13. The external data storage device of claim 11, wherein at least one of the first and second pockets comprise a plurality of axially-directed insular extensions that are generally perpendicular to the first and second plurality of generally radially-extending ribs, at least some of the plurality of axially-directed insular extensions defining respective free ends configured to contact the shock mount.

14. The external data storage device of claim 13, wherein the plurality of axially-directed insular extensions are generally cylindrical in shape.

15. The external data storage device of claim 13, wherein the plurality of axially-directed insular extensions are configured according to a weight of the data storage device assembly.

16. The external data storage device of claim 13, wherein a number and shape of the plurality of axially-directed insular extensions are selected according to a desired stiffness of the plurality of shock mounts.

17. The external data storage device of claim 11, wherein a stiffness of the plurality of shock mounts is determined at least in part by:
a durometer of a material of the plurality of shock mounts, and
a surface area of each of the plurality of first and second shock mount-contacting surfaces.

18. The external data storage device of claim 11, wherein an aggregate surface area of the first and second shock mount-contacting surfaces is determined at least in part upon a number of the first and second plurality of generally radially-extending ribs and a surface area of each of the plurality of first and second shock mount-contacting surfaces.

19. The external data storage device of claim 11, wherein the first and second plurality of ribs are configured according to a weight of the data storage device assembly.

20. The external data storage device of claim 11, wherein a number and shape of the first and second plurality of ribs are selected according to a desired stiffness of the plurality of shock mount.

* * * * *